Sept. 30, 1952    J. E. TERRY    2,612,342
THROTTLE VALVE FOR PNEUMATIC TOOLS
Filed Oct. 18, 1947

INVENTOR.
JACK E. TERRY
BY *Fay, Golrick & Fay*
ATTORNEYS

Patented Sept. 30, 1952

2,612,342

UNITED STATES PATENT OFFICE 2,612,342

THROTTLE VALVE FOR PNEUMATIC TOOLS

Jack E. Terry, North Royalton, Ohio, assignor, by mesne assignments, to Superior Pneumatic & Manufacturing, Inc., Garfield Heights, Ohio, a corporation of Ohio Application October 18, 1947, Serial No. 780,633

1 Claim. (Cl. 251—137)

The present invention relates to a throttling valve for pneumatic tools or the like.

An object of the present invention is to provide a plunger operated valve for a pneumatic tool by which the flow of air to the tool may be throttled and controlled to obtain the exact, desired flow of air to the tool.

Another object of the invention is to provide a valve of the character referred to which may be easily manufactured and which will provide long trouble free service.

Other objects and advantages of the invention will be apparent from the following description of a preferred form of the invention, reference being made to the accompanying drawings wherein.

Figure 1:
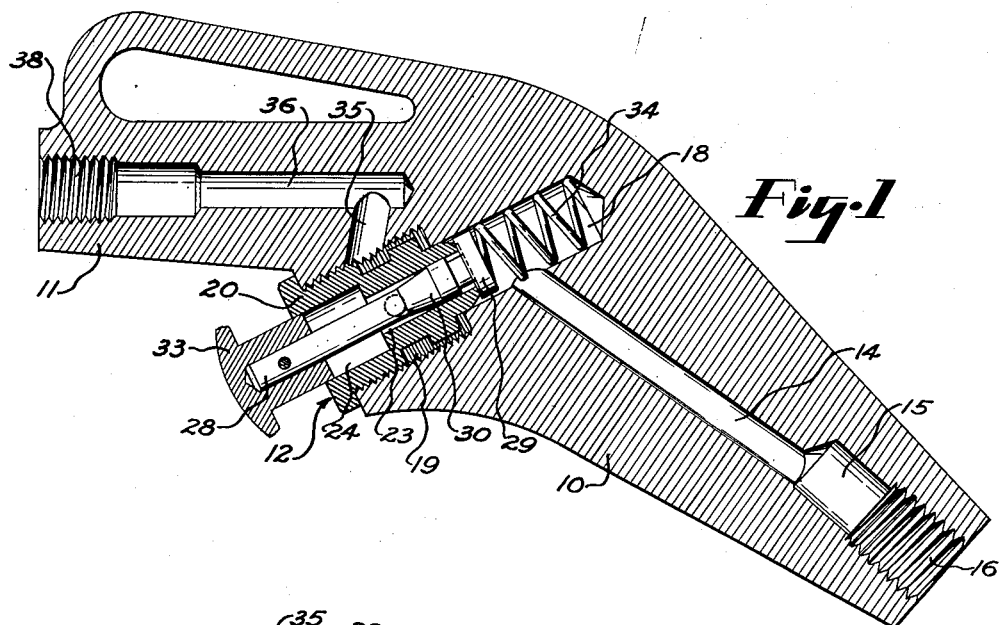
Fig. 1 is a longitudinal sectional view of a hand operated blow gun.
Figure 3:
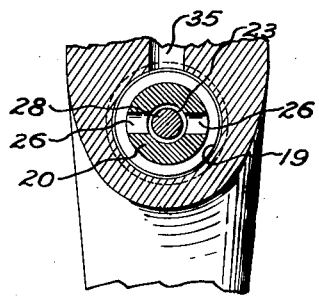
Figure 2:
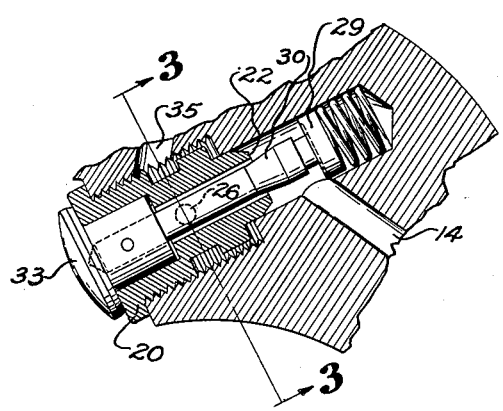
Fig. 2 is a fragmentary view similar to that of Fig. 1 but showing certain parts of the valve mechanism in a different position than that shown in Fig. 1; and, Fig. 3 is a view in section taken substantially on line 3—3 of Fig. 2.

The valve of my invention may be used in various types of pneumatic tools, but for the purpose of illustrating the invention I have shown the valve incorporated in a hand manipulated blow gun which is used for clearing surfaces of loose particles by directing a stream of air against the particles. The blow gun is preferably formed of a casting having a handle portion 10 and a nozzle portion 11. A finger operated valve mechanism 12 is disposed intermediate the handle and the nozzle portion 11 for controlling the flow of air through the gun. The handle portion 10 is bored longitudinally at 14 and counterbored at 15 adjacent the butt of the handle, and preferably the counterbore is threaded as at 16 for attaching the nipple of an air supply line thereto. A cavity 18 is formed in the casting, as by boring, and the upper end of the bore 14 enters the cavity 18. The outer end of cavity 18 is counterbored and threaded to form a recess as indicated at 19 for receiving a tubular valve seat member 20 which is threaded into the recess 19. The inner end of the member 20 is provided with a tapered end portion which projects into the cavity 18 and which forms an annular valve seat 22. Preferably an air-tight fit is effected between the walls of the cavity 18 and the inner end of the valve seat member. The valve seat member 20 is provided with two aligned bores 23 and 24, the bore or counterbore 24 being of larger diameter than that of 23. The portion of the valve seat member through which the bore 23 extends is of reduced diameter relative to the diameter of recess 19 so that an annular passage is formed about the member. The member is bored transversely as at 26 for forming air passages which interconnect central passage 23 and the interior of the recess 19.

A valve stem 28 extends through the passage 23 and into the cavity 18. The inner end of the stem has a disk-like valve plate 29 attached thereto which is adapted to seat on the annular valve seat 22 for closing passage 23. The valve stem has a conical section thereon which is flared outwardly toward the valve plate as indicated at 30. The base of the conical section thereof is substantially the same as the diameter of the passage 23 so that substantially all passage of air will be blocked when the conical section is within passage 23. It will be seen that as the stem 28 is moved inwardly relative to the cavity 18 the conical section 30, passing from the entrance to passage 23 and into cavity 18, will gradually increase the effective opening from the cavity 18 into the passage 23 so that a nicely controlled flow of air can be effected by the proper positioning of the stem 28 in the passage 23. It will be noted that the said valve plate or head 29 has a cross sectional clearance with the bore of the cavity 18 which is greater than the cross sectional clearance between the small end of the conical portion of the valve stem and the bore of the valve seat member. The outer end of the stem 28 is provided with a presser button 33, which button closely fits the counterbore 24 for preventing escaping of air about the button and the inner face of the button is acted on by the pressure in the counterbore 24. It will be apparent that the valve stem 28 may be actuated by pressing the button inwardly, and that pressure in the cavity behind the valve head acts in concert with pressure on the operating means to resist sudden opening of the valve. The valve stem 28 is normally urged toward the valve closing position by a coil spring 34 interposed between the inner end of the cavity 18 and the valve plate 29 so that the positioning of the valve stem by the finger of the operator may be accurately controlled.

Air passing through passage 23 escapes through passages 26 and into the recess 19. A passage 35 leads from recess 19 upwardly to a bore 36, which bore is counterbored and threaded as at 38 for the attachment of a nozzle (not shown) to the gun, if desired, through which air is directed by the operator to the point desired.

It will be apparent that the operator may control the valve so that the flow of air through the gun will range from zero to full blast, as desired by the operator. Also, the valve is easily assembled and the parts lend themselves to ready manufacture.

As mentioned hereinbefore, the valve has many applications other than for blow guns. For example, it is particularly suited for controlling hand operated pneumatic hammers and chisels.

Although I have described but one form of the invention, other forms might be adopted, all falling within the scope of the claim which follows.

I claim:

A throttle valve for a pneumatic tool comprising a housing having a recess extending from its exterior and terminating in a generally cylindrical deep cavity, a high pressure passage leading into the cavity, a low pressure passage leading from adjacent the outer end of the recess, a valve seat member within the outer end of the recess, said valve seat member having a bore therethrough counterbored at its outer end and an outlet through its wall arranged to communicate with the low pressure passage, said seat member being provided with an inwardly facing seat, a valve stem within the bore of the seat member, operating means on the external end of said stem forming a close fit within said counterbore and said valve stem having a frustro-conical section whose larger diameter is just slightly less than the inner diameter of the bore and a flanged head within the cavity seating on said valve seat, said head having a cross sectional clearance with the bore of the cavity which is greater than the cross sectional clearance between the small end of the conical portion of the valve stem and the bore of the valve seat member whereby the pressure in the cavity behind the valve head acts in concert with pressure on the operating means to resist sudden opening of the valve.

JACK E. TERRY.

REFERENCES CITED

The following references are of record in the file of this patent:

UNITED STATES PATENTS

| Number | Name | Date |
|---|---|---|
| 640,878 | Curley | Jan. 9, 1900 |
| 1,314,195 | Jarvis | Aug. 26, 1919 |
| 1,506,145 | Willis | Aug. 26, 1924 |
| 1,506,487 | Leins | May 14, 1935 |
| 2,001,487 | Doherty | May 14, 1935 |
| 2,255,879 | Garvey | Sept. 16, 1941 |
| 2,372,392 | Pletman | Mar. 27, 1945 |

FOREIGN PATENTS

| Number | Country | Date |
|---|---|---|
| 108,292 | Great Britain | of 1917 |
| 150,066 | Switzerland | of 1931 |